(12) United States Patent
Seccamonte et al.

(10) Patent No.: US 12,709,270 B2
(45) Date of Patent: Aug. 18, 2026

(54) ESTIMATING SPEED PROFILES

(71) Applicant: Motional AD LLC, Boston, MA (US)

(72) Inventors: Francesco Seccamonte, Singapore (SG); Kostyantyn Slutskyy, Singapore (SG)

(73) Assignee: Motional AD LLC, Boston, MA (US)

( * ) Notice: Subject to any disclaimer, the term of this patent is extended or adjusted under 35 U.S.C. 154(b) by 32 days.

(21) Appl. No.: 19/034,721

(22) Filed: Jan. 23, 2025

(65) Prior Publication Data

US 2025/0162584 A1 May 22, 2025

Related U.S. Application Data

(63) Continuation of application No. 18/388,878, filed on Nov. 13, 2023, now Pat. No. 12,214,787, which is a
(Continued)

(51) Int. Cl.
*B60W 30/14* (2006.01)
*B60W 40/105* (2012.01)
(Continued)

(52) U.S. Cl.
CPC ........ *B60W 30/143* (2013.01); *B60W 40/105* (2013.01); *B60W 50/082* (2013.01);
(Continued)

(58) Field of Classification Search
CPC ....... B60W 2520/10; B60W 2720/103; B60W 2720/24; B60W 30/143; B60W 40/105;
(Continued)

(56) References Cited

U.S. PATENT DOCUMENTS 11,126,199 B2 * 9/2021 Zhang .................. G05D 1/0223
11,192,545 B1 12/2021 Russell et al.
(Continued)

FOREIGN PATENT DOCUMENTS

CN 109410586 3/2019
DE 102014204206 9/2014
(Continued)

OTHER PUBLICATIONS

[No. Author Listed], "SAE International: Surface Vehicle Recommended Practice," J3016, Sep. 20, 2016, 30 pages.
(Continued)

*Primary Examiner* — Wade Miles
*Assistant Examiner* — Zachary Joseph Wallace
(74) *Attorney, Agent, or Firm* — Fish & Richardson P.C.

(57) ABSTRACT

Among other things, we describe techniques for estimating a speed profile for a proposed trajectory for a vehicle and operating the vehicle along the proposed trajectory according to the speed profile, including a method for: obtaining, by a planning circuit on a vehicle, a proposed trajectory for the vehicle in response to a driving scenario; obtaining, by the planning circuit, an estimated speed profile, and a confidence score, wherein the confidence score represents a similarity of the estimated speed profile to an actual speed profile that would be generated by a control circuit for the proposed trajectory; determining whether the confidence score meets a confidence threshold; and in accordance with a determination that the confidence score exceeds the confidence threshold, operating, by a control circuit on the vehicle, the vehicle along the proposed trajectory.

21 Claims, 15 Drawing Sheets

Related U.S. Application Data continuation of application No. 16/880,967, filed on May 21, 2020, now Pat. No. 11,814,046.

(60) Provisional application No. 62/906,691, filed on Sep. 26, 2019, provisional application No. 62/854,284, filed on May 29, 2019.

(51) Int. Cl.
*B60W 50/08* (2020.01)
*B60W 60/00* (2020.01)

(52) U.S. Cl.
CPC ...... *B60W 50/085* (2013.01); *B60W 60/0011* (2020.02); *B60W 2520/10* (2013.01); *B60W 2720/24* (2013.01)

(58) Field of Classification Search
CPC ............. B60W 50/085; B60W 60/0011; G01S 17/931; G06N 20/10; G06N 20/20; G06N 3/084; G06N 5/01
See application file for complete search history.

(56) References Cited

U.S. PATENT DOCUMENTS

| | | | | |
|---|---|---|---|---|
| 11,814,046 | B2 | 11/2023 | Seccamonte et al. | |
| 2014/0277835 | A1 | 9/2014 | Filev et al. | |
| 2015/0344036 | A1 | 12/2015 | Kristinsson et al. | |
| 2018/0017971 | A1 | 1/2018 | Di Cairano et al. | |
| 2018/0292222 | A1 | 10/2018 | Lin et al. | |
| 2018/0364725 | A1 | 12/2018 | Lonari | |
| 2019/0025841 | A1 | 1/2019 | Haynes et al. | |
| 2019/0034794 | A1 | 1/2019 | Ogale et al. | |
| 2019/0063939 | A1 | 2/2019 | Chai et al. | |
| 2019/0072966 | A1 | 3/2019 | Zhang et al. | |
| 2019/0129436 | A1 | 5/2019 | Sun et al. | |
| 2019/0152490 | A1 | 5/2019 | Lan et al. | |
| 2019/0164007 | A1* | 5/2019 | Liu | G05D 1/0088 |
| 2019/0295412 | A1* | 9/2019 | Grubwinkler | G08G 1/0141 |
| 2020/0257931 | A1 | 8/2020 | Yershov et al. | |
| 2020/0331473 | A1* | 10/2020 | Schiegg | B60W 30/182 |
| 2020/0377090 | A1 | 12/2020 | Seccamonte et al. | |
| 2022/0219691 | A1* | 7/2022 | Maleki | G06F 11/0754 |
| 2024/0075927 | A1 | 3/2024 | Seccamonte et al. | |

FOREIGN PATENT DOCUMENTS

| | | |
|---|---|---|
| DE | 102015108270 | 12/2015 |
| DE | 112017003517 | 3/2019 |
| EP | 2537727 | 12/2012 |
| EP | 2886410 | 6/2015 |
| EP | 3323669 | 5/2018 |
| JP | 2008129804 | 6/2008 |
| KR | 20150062834 | 6/2015 |

OTHER PUBLICATIONS

Bemporad et al., “Model predictive control based on linear programming—the explicit solution,” IEEE Transactions on Automatic Control, Dec. 2002, 47:12: 1974-1985.

Borrelli et al., “Predictive Control for Linear and Hybrid Systems,” 1rst ed., Cambridge University Press, Oct. 26, 2016, 461 pages.

Sadikov et al., “Pessimistic Heuristics Beat Optimistic Ones in Real-Time Search”, ECAI, 148-152, 2006.

* cited by examiner

ESTIMATING SPEED PROFILES

CROSS-REFERENCE TO RELATED APPLICATIONS

This application is a continuation of U.S. application Ser. No. 18/388,878, filed Nov. 13, 2023, now allowed, which is a continuation of U.S. application Ser. No. 16/880,967, filed May 21, 2020, now U.S. Pat. No. 11,814,046, which claims priority to U.S. Provisional Application No. 62/906,691, filed Sep. 26, 2019 and to U.S. Provisional Patent Application No. 62/854,284, filed May 29, 2019, the entire contents of each of which is incorporated herein by reference.

FIELD OF THE INVENTION

This specification relates to speed profile estimation.

BACKGROUND

Autonomous vehicles have benefits over human-driven vehicles, e.g., by reducing road fatalities, traffic congestion, parking congestion, and improving fuel efficiency. One component of an autonomous vehicle can make decisions and generate a proposed trajectory the vehicle should take, by taking account of obstacles, the environment proximate to the vehicle, or other relevant driving conditions. Another component of the vehicle can receive the proposed trajectory and operate the vehicle in accordance with the proposed trajectory. This process can be repeated multiple times as the vehicle is operated through different driving scenarios having different driving conditions.

DETAILED DESCRIPTION

Figure 1:
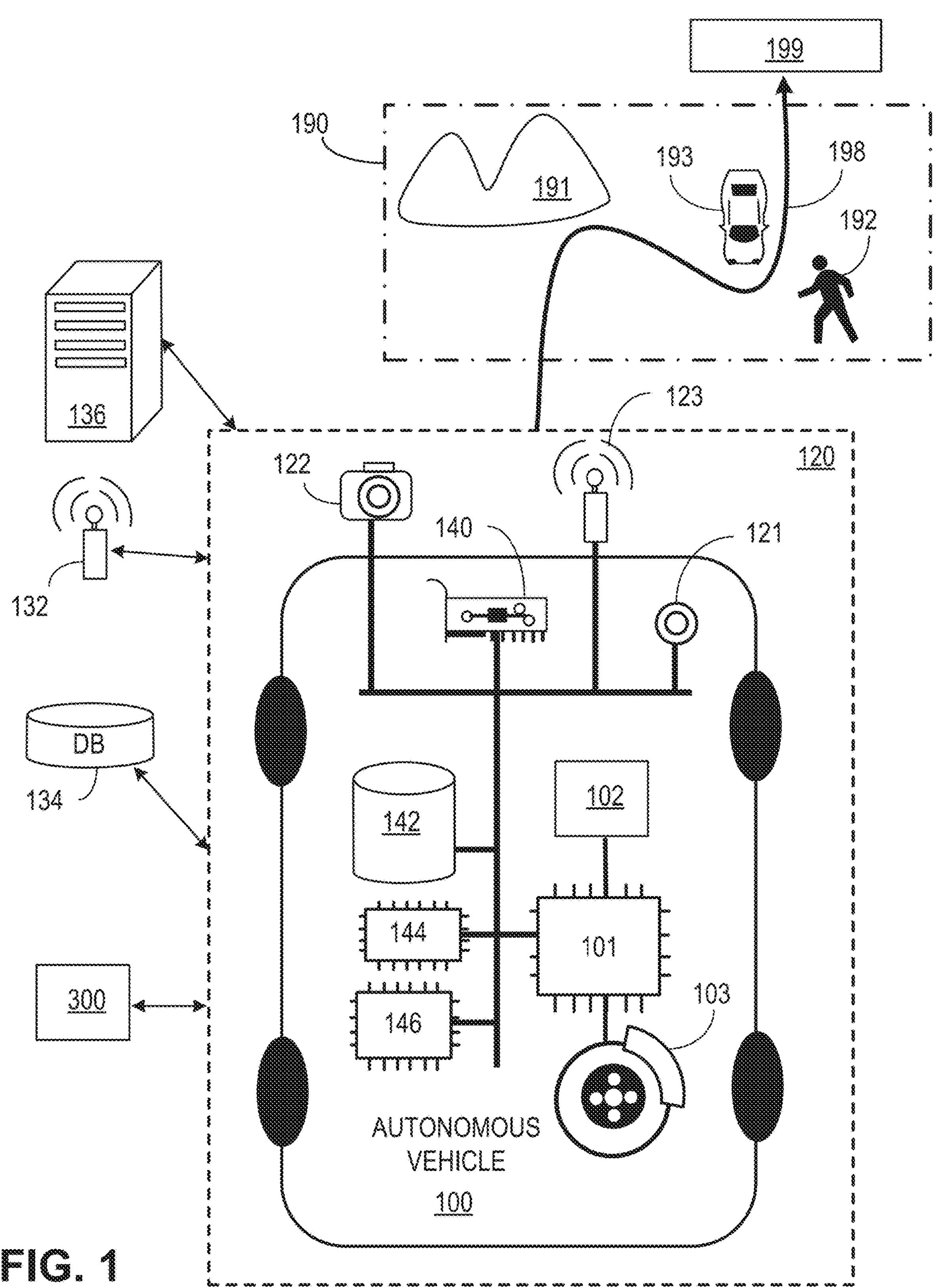
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements In an embodiment.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Speed Profile Estimation

General Overview

As described in more detail below with respect to FIG. 13 through FIG. 15, a vehicle (such as an autonomous vehicle)

can include a planning circuit that can obtain an estimated speed profile for at least a part of a proposed trajectory for the vehicle. A control circuit of the vehicle can generate a speed profile estimate using a machine learning model that has previously been trained on trajectories for different driving scenarios. The machine learning model can output an estimated speed profile for at least one segment of an input proposed trajectory, as well as output a confidence score representing an expected level of similarity between the estimated speed profile and an actual speed profile that would be generated by the control circuit of the vehicle. Depending on the confidence score, the planning circuit can send the proposed trajectory to the control circuit, which in turn, causes the control circuit to operate the vehicle along the proposed trajectory. The control circuit can execute incremental algorithms for path planning, and also generate a speed profile estimate for a segment of an input proposed trajectory.

These techniques have several advantages. For example, providing the planning circuit with an estimated speed profile and corresponding confidence score for that speed profile allows for better proposed trajectories passed to the control circuit, based on different criteria dependent on the actual speed profile that would be generated by the control circuit after receiving a proposed trajectory, e.g., feasibility, safety, rule compliance, and comfort of the maneuver. Estimating a speed profile is computationally more feasible and faster than generating a speed profile for each proposed trajectory generated by the planning circuit. Estimating a speed profile using a machine learning model over a simple heuristics approach also enables a confidence score to be estimated, allowing the planning circuit to take a measured level of confidence into account when deciding which proposed trajectory to send to the control circuit. The machine learning model can be trained to take into account environmental factors, e.g., occlusions, as well as system properties, e.g., the performance of different sensors. The confidence score of a speed profile also reflects reliability of data received from sensors and processed through a perception pipeline.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, a "driving scenario" refers to a set of conditions describing the environment proximate to a vehicle at a particular time. The driving scenario may include conditions describing the road the vehicle is on, as well as weather or visibility conditions at a particular time. The driving scenario may refer to objects, e.g., pedestrians or other vehicles, detected by the sensors in a vehicle's path while the vehicle is in operation. For each detected object, the driving scenario also refers to a set of respective externally observable parameter values for the object, e.g., the velocity and acceleration of the object. The driving scenario can change as a vehicle travels along a trajectory, which can prompt a change in trajectory for the vehicle. For example, the vehicle may travel along one trajectory and suddenly meet an obstacle blocking the vehicle from continuing along the trajectory. This new obstacle can be represented as a new driving scenario, and in response the vehicle can be operated by techniques described in this specification to travel along a new trajectory.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, In an embodiment, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In an embodiment, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
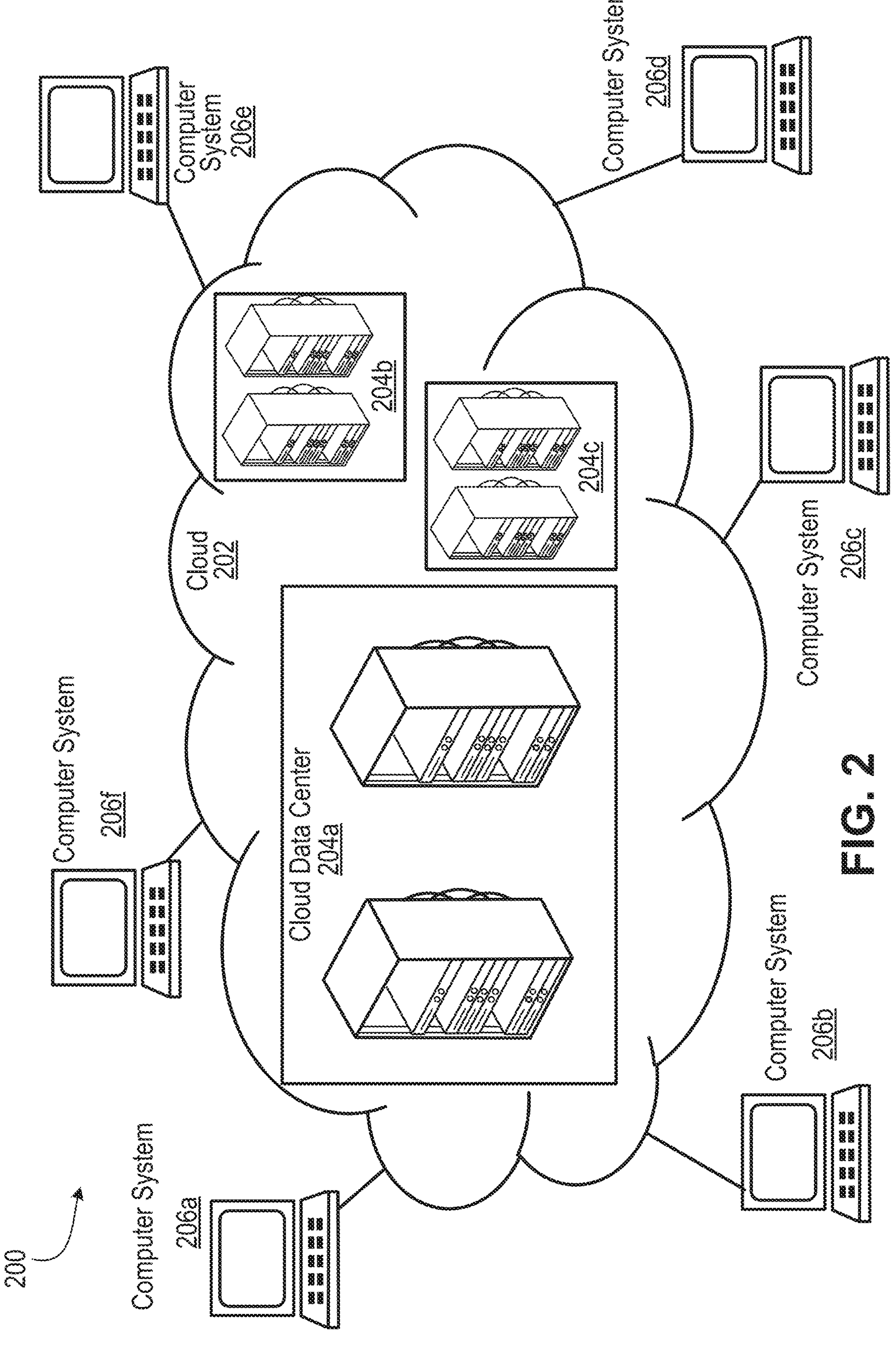
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers **204*a*, 204*b*, and 204*c* that are interconnected through the cloud 202. Data centers 204*a*, 204*b*, and 204*c* provide cloud computing services to computer systems 206*a*, 206*b*, 206*c*, 206*d*, 206*e*, and 206*f* connected to cloud 202**.

The cloud computing environment 200 includes one or more cloud data centers. In general, a cloud data center, for example the cloud data center **204*a* shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204***a* has many computing systems distributed through many racks.

The cloud 202 includes cloud data centers 204*a*, 204*b*, and 204*c* along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents one or more interconnected internetworks, such as the public Internet.

The computing systems 206*a-f* or cloud computing services consumers are connected to the cloud 202 through network links and network adapters. In an embodiment, the computing systems 206*a-f* are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206*a-f* are implemented in or as a part of other systems.

Figure 3:
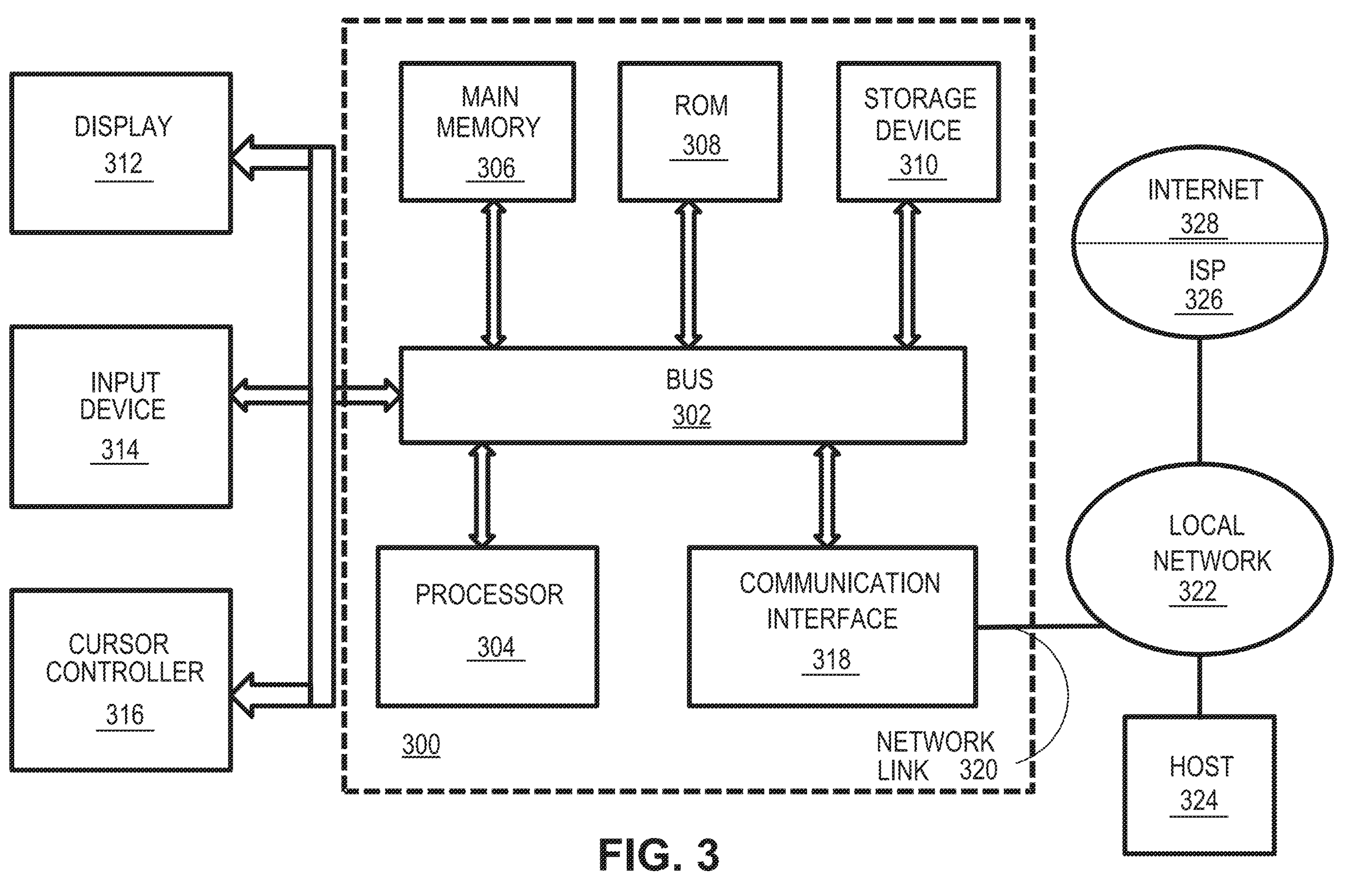
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the “Internet” 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
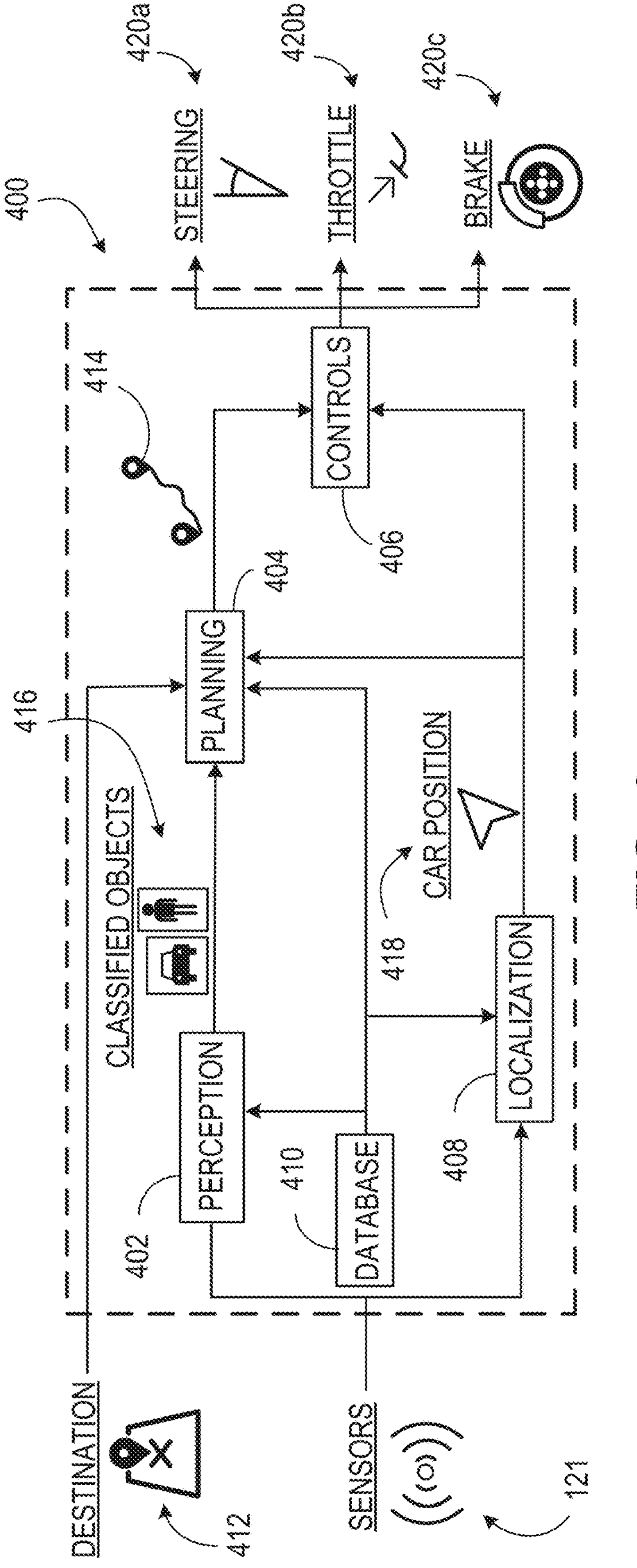
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In an embodiment, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420*a-c* (e.g., steering, throttling, braking, ignition) of the AV in a manner that will cause the AV 100 to travel the trajectory 414 to the destination 412. For example, if the trajectory 414 includes a left turn, the control module 406 will operate the control functions 420*a-c* in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
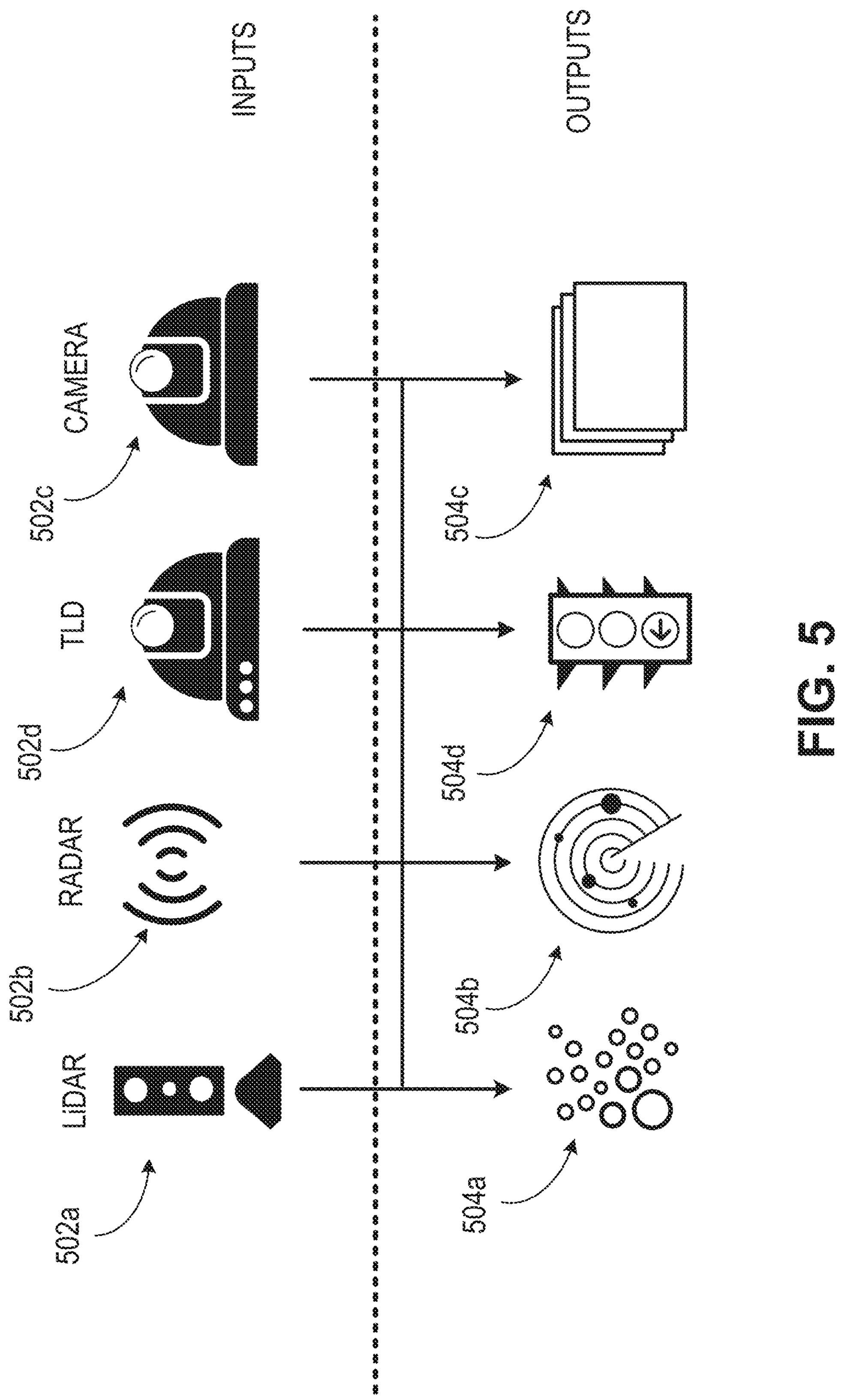
FIG. 5 shows an example of inputs and outputs that may be used by a perception module.

FIG. 5 shows an example of inputs 502*a-d* (e.g., sensors 121 shown in FIG. 1) and outputs 504*a-d* (e.g., sensor data) that is used by the perception module 402 (FIG. 4). One input 502*a* is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as a point clouds) that are used to construct a representation of the environment 190.

Another input 502*b* is a RADAR system. RADAR is a technology that uses radio waves to obtain data about nearby physical objects. RADARs can obtain data about objects not within the line of sight of a LiDAR system. A RADAR system 502*b* produces RADAR data as output 504*b*. For example, RADAR data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual navigation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In an embodiment, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In an embodiment, an early fusion technique is used. An early fusion technique is characterized by combining outputs before one or more data processing steps are applied to the combined output. In an embodiment, a late fusion technique is used. A late fusion technique is characterized by combining outputs after one or more data processing steps are applied to the individual outputs.

Figure 6:
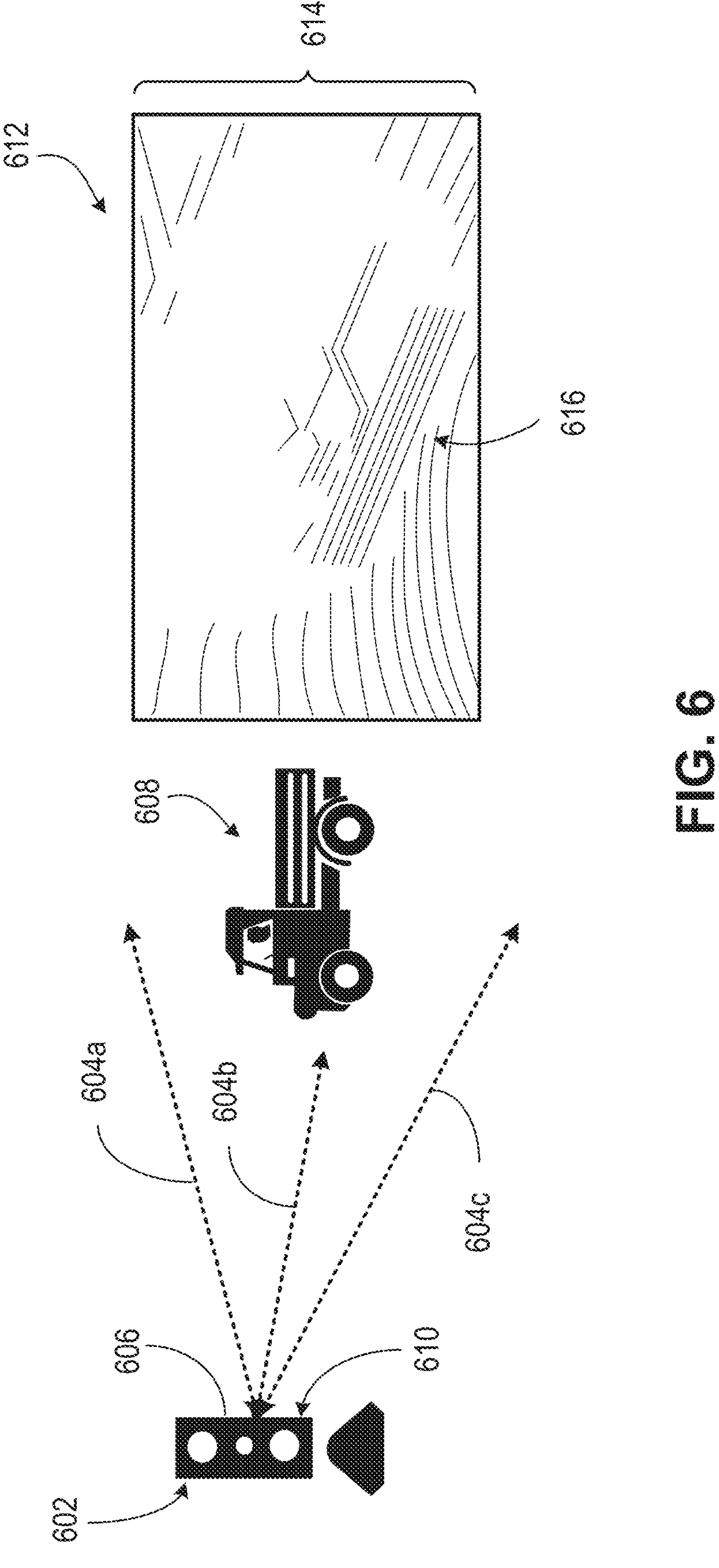
FIG. 6 shows an example of a LiDAR system.

FIG. 6 shows an example of a LiDAR system 602 (e.g., the input 502*a* shown in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
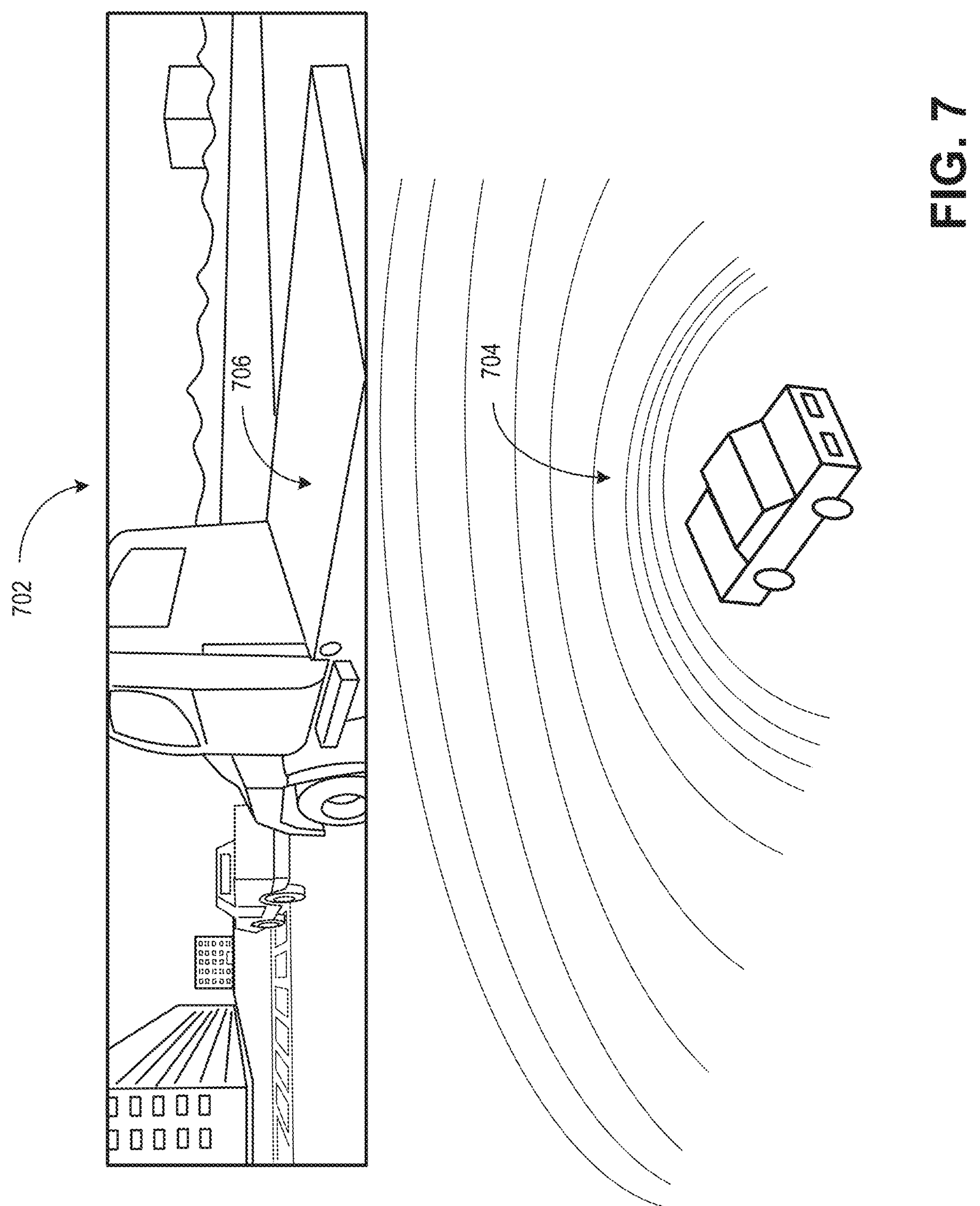
FIG. 7 shows the LiDAR system in operation.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
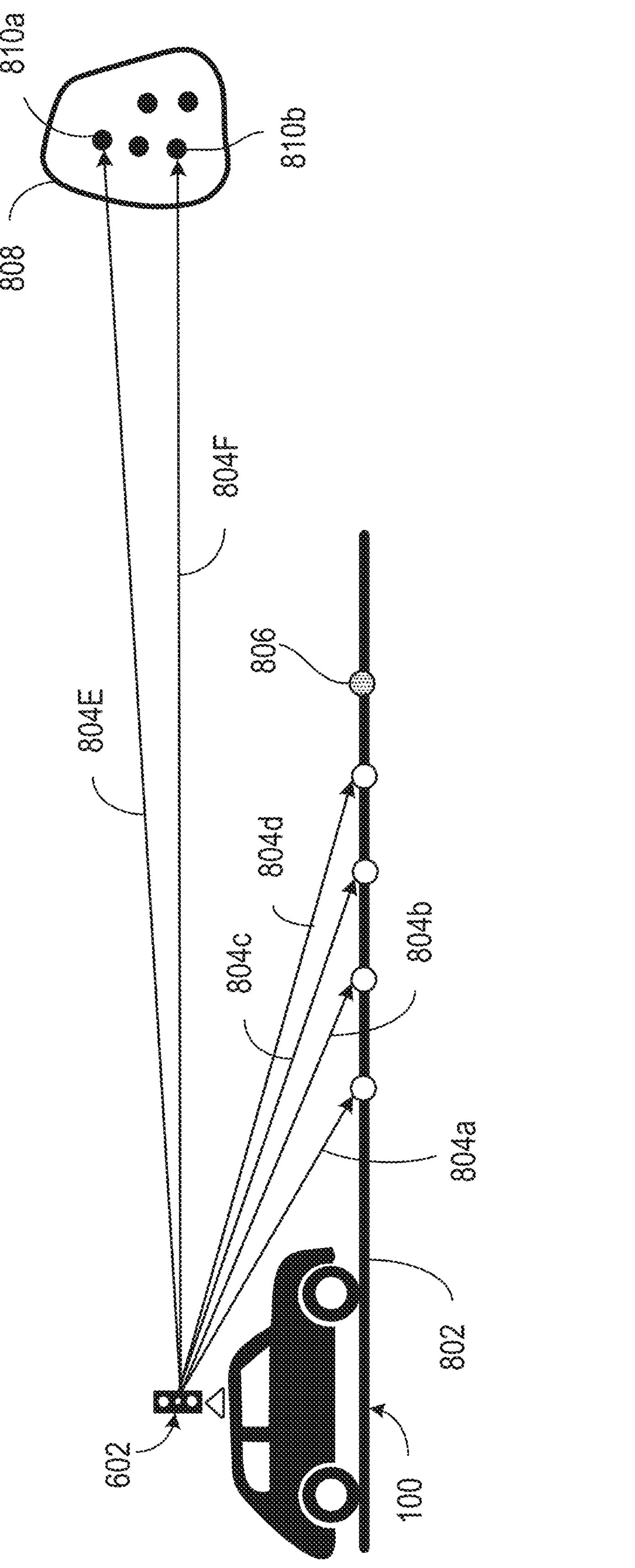
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
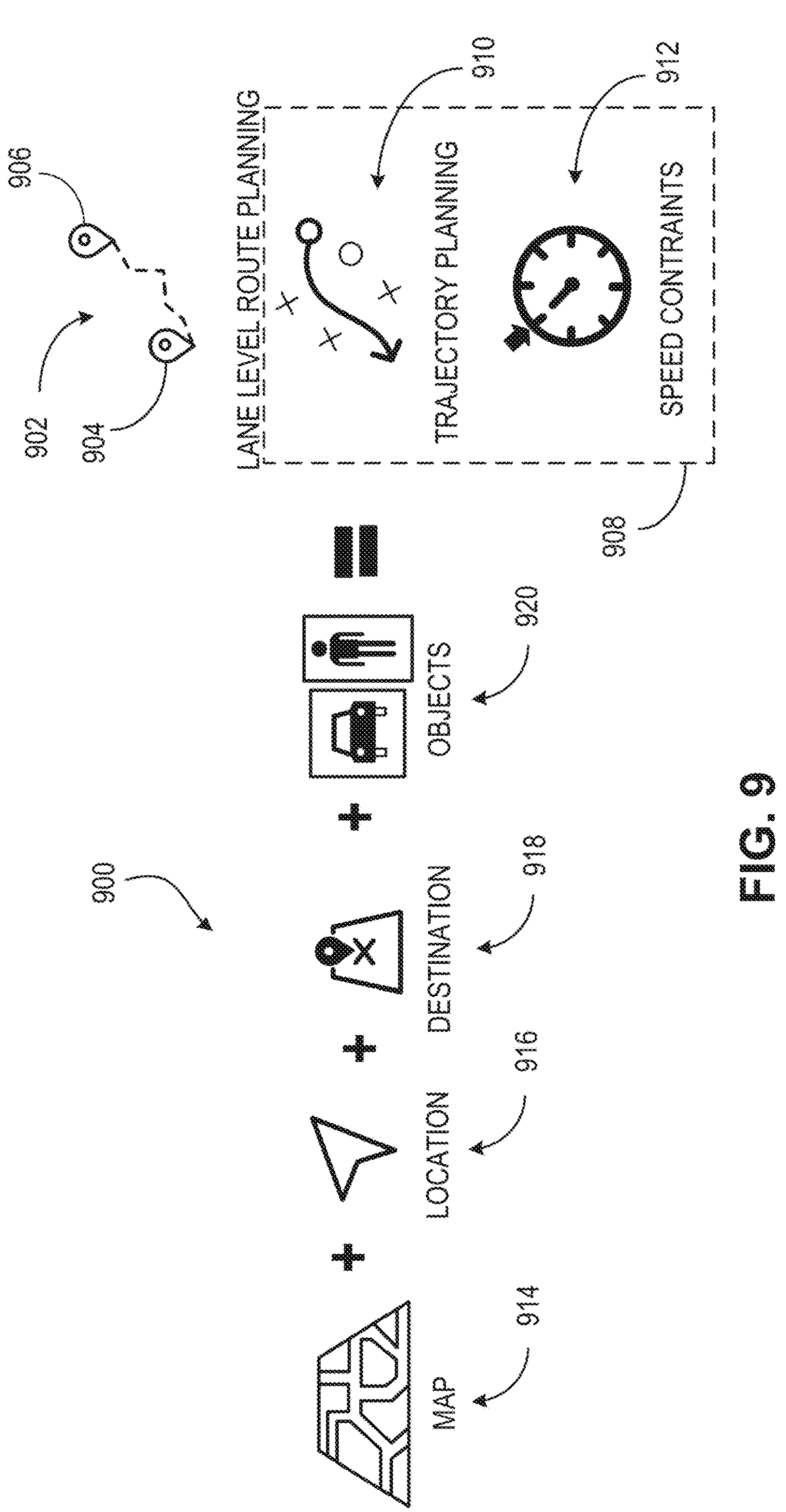
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In an embodiment, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
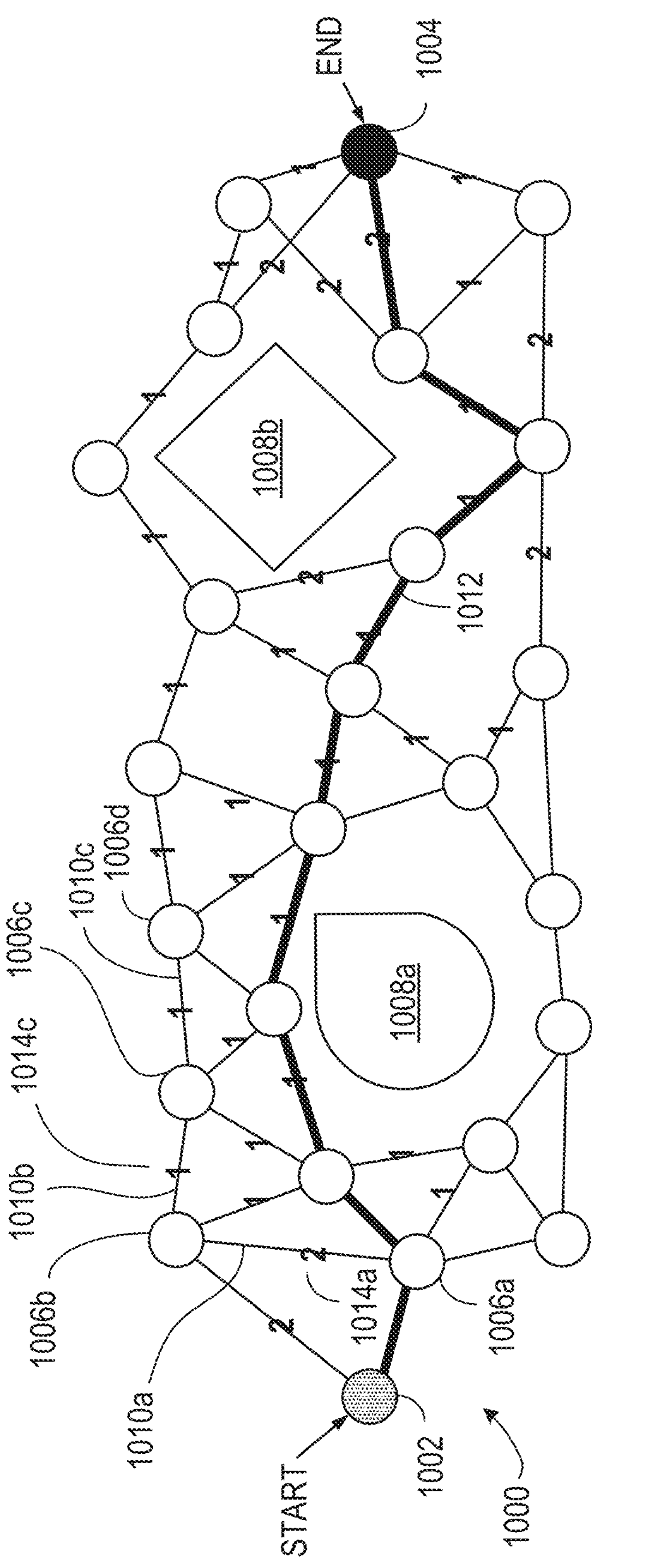
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006*a-d* represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are a static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
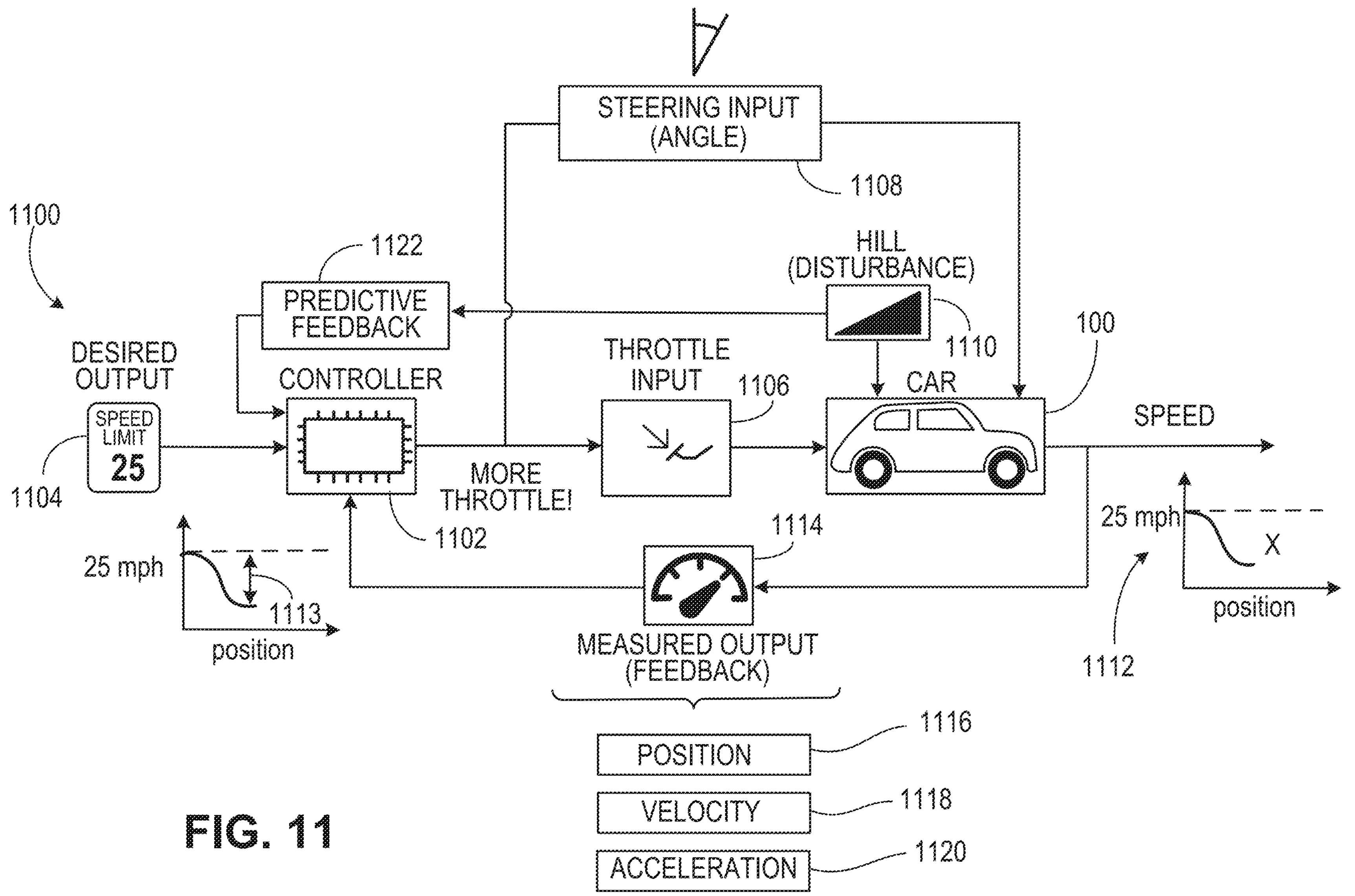
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
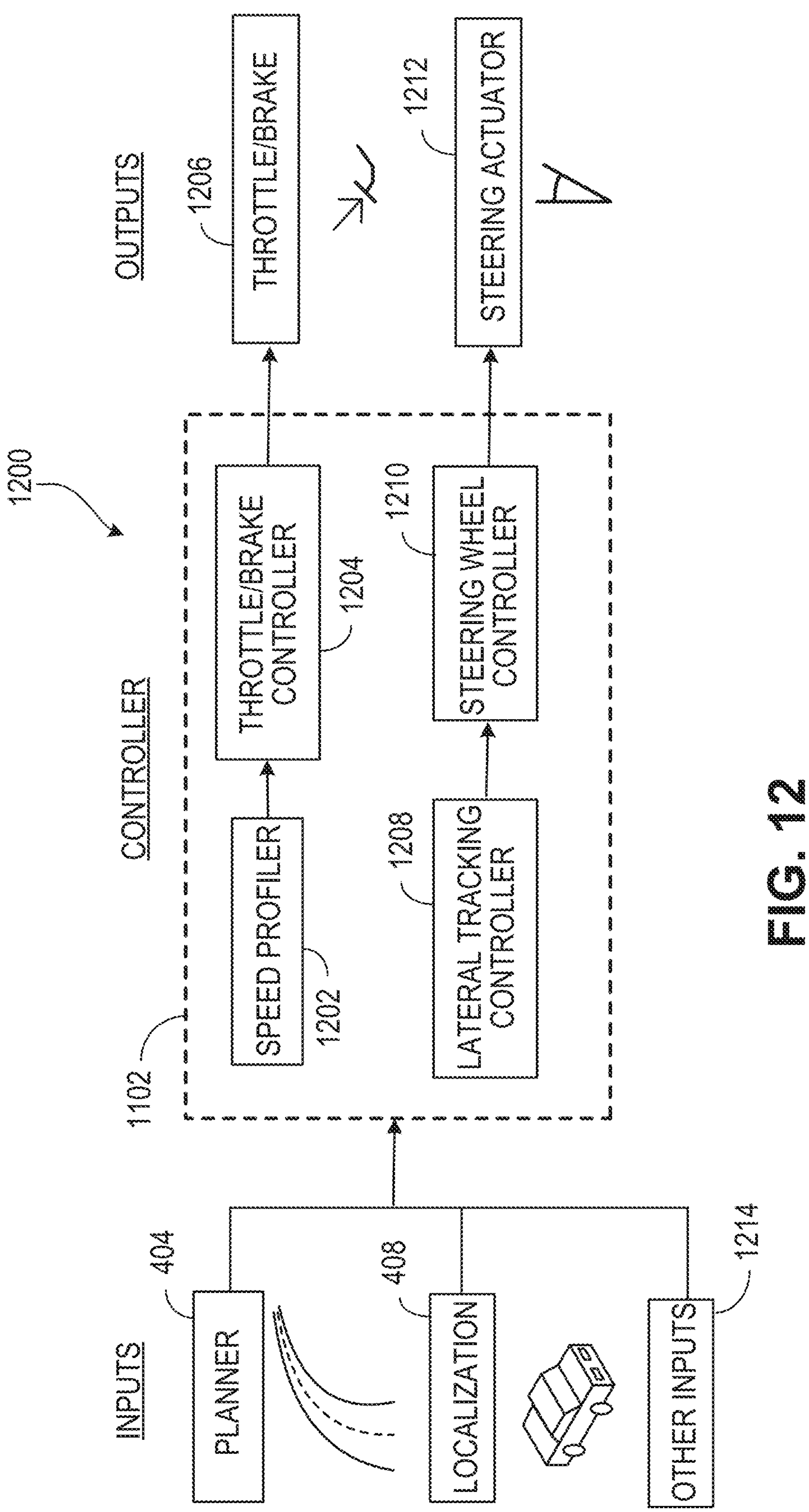
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

As used herein, a "speed profile" refers to data defining characteristics of instructions from a speed profiler to a throttle/brake controller. For example, if the planning circuit 404 sends a trajectory to the control circuit 406 to operate the AV 100 along the trajectory, the speed profiler 1202 generates a corresponding speed profile for the trajectory. The control circuit 406 operates the AV 100 using the characteristics of instructions defined by the speed profile or by using characteristics of instructions within a predetermined threshold of the characteristics defined by the speed profile.

In an embodiment, the speed profile for a trajectory characterizes the velocity at which the control circuit 406 will cause the AV 100 to operate along one or more segments of the trajectory. For example, the control circuit 406, operating the AV 100 in accordance with the speed profile generated by the speed profiler 1202 for the trajectory, operates the AV 100 more slowly on "off-road" segments of unpaved roads or open fields, and then accelerate the AV 100 upon reaching a segment of paved road. In an embodiment, the velocity at which the control circuit 406 will cause the AV 100 to operate along the one or more segments of the trajectory depends on environmental conditions, e.g., weather, conditions of the road, and observable characteristics of pedestrians, other vehicles, and objects in general. In an embodiment, observable characteristics include the presence, location, and motion of perceived objects.

In an embodiment, the speed profile for a trajectory characterizes the acceleration at which the control circuit 406 will cause the AV 100 to operate along the one or more segments of the trajectory. Similar to the characterization of the velocity of the AV 100 along the trajectory, the control circuit 406 can operate the AV 100 with varying levels of acceleration along the trajectory through different segments. In an embodiment, the speed profile for a trajectory characterizes both the velocity and the acceleration at which the control circuit 406 will cause the AV 100 to operate along the one or more segments of the trajectory.

In an embodiment, the speed profile for a trajectory characterizes the jerk at which the control circuit 406 will cause the AV 100 to operate along the one or more segments of the trajectory. Similar to the characterization of the acceleration and velocity of the AV 100 along the trajectory, the control circuit 406 can operate the AV 100 with varying levels of jerk along the trajectory through different segments. The jerk at which the control circuit 406 will cause the AV 100 to operate along the one or more segments of the segments of the trajectory can depend in part on comfort metrics of passengers of the AV 100. Depending on a perceived level of comfort for the passengers based on the comfort metrics, the control circuit 406 reduces the jerk as the AV 100 operates along the trajectory.

In general, a speed profiler can generate a speed profile for a given trajectory depending on the driving scenario the AV 100 is in and can impose conditions on the speed profiler 1202. Conditions which affect the speed profile generated for a trajectory include the following, either alone or in combination:

1. The feasibility of the speed profile, e.g., whether operating the AV 100 along the trajectory with the selected speed profile is physically possible for the AV 100 within the laws of nature or physical or imposed limitations of the AV 100.

2. The safety of operating the AV 100 along the trajectory in accordance with a speed profile, e.g., whether operating the AV 100 along the trajectory in accordance with the generated speed profile is safe for passengers of the AV 100 or others proximate to the AV 100 as the AV 100 travels along the trajectory.

3. Compliance with traffic rules and laws while operating the AV 100 along the trajectory in accordance with a speed profile, e.g., whether operating the AV 100 along the trajectory in accordance with the corresponding speed profile obeys posted speed limits.

4. The comfort of passengers as the AV 100 travels along the trajectory in accordance with the speed profile, e.g., whether operating the AV 100 along the trajectory in accordance with the selected speed profile includes jerky accelerations/decelerations that are likely to make passengers uncomfortable.

5. Proximity and interaction with road elements while operating the AV 100 along one or more roads. Road elements include traffic signs, including posted traffic signs proximate to a road or signs indicated on the road itself, e.g., a zebra crossing. Road elements can indicate an intersection or an upcoming turn with limited visibility which affect how the speed profiler 1202 generates a respective speed profile for the driving scenario.

In an embodiment, these and other conditions are established empirically, e.g., as a result of previous data collected on speed profiles generated for various trajectories; manually, e.g., based on expert opinion or personal experience; or following a rule-based approach.

In general, the speed profiler 1202 generates a speed profile for a trajectory after the planning circuit 402 generates the trajectory and sends the trajectory to the control circuit 406. As a consequence, the generated speed profile for the trajectory is unavailable to the planning circuit 404, because the speed profile is generated after the planning circuit 404 has already sent the trajectory to the control circuit 406. Therefore, the planning circuit 404 is unable to update a trajectory in response to the generated speed profile, and also conventionally cannot estimate the time needed to travel along one or more segments of a trajectory accurately. This is at least because the planning circuit 404 can receive more limited information about the AV 100 versus the control circuit 406, as a result of the planning circuit 404 and the control circuit 406 having access to different subsets of sensor data during the operation of the AV 100.

Ideally the planning circuit 404, given the corresponding speed profile for a proposed trajectory, proposes a new trajectory to the control circuit 406 instead, e.g., because the generated speed profile poorly satisfies or does not satisfy one or more imposed conditions as discussed above.

As used herein, a "proposed trajectory" refers to a trajectory that can be traveled by the AV 100, but has not been sent to the control circuit 406 to operate the AV 100 to travel along the trajectory. The planning circuit 404 can select a proposed trajectory to send to the control circuit 406.

The planning circuit 404 generates many different proposed trajectories before sending a trajectory to the control circuit 406. In an embodiment, the planning circuit 404 generates many different proposed trajectories as necessary because the AV 100 operates in different driving scenarios, as discussed above. The planning circuit 404 sends trajectories many times a second to the control circuit 406 in response to the AV 100 operating in new driving scenarios. In an embodiment, the planning circuit 404 selects a proposed trajectory to send to the control circuit 406 based on some predetermined fitness function or by any appropriate set of criteria.

The planning circuit 404 first obtains a set of available trajectories from a potentially infinite set of paths and trajectories the AV 100 can travel along those paths. In an embodiment, the planning circuit 404 obtains the set of available trajectories through any appropriate technique in dynamic programming to obtain the set of available trajectories, even when it is computational infeasible for the planning circuit 404 to individually inspect every possible trajectory.

Then, the planning circuit 404 represents the set of available trajectories as a graph. Each vertex of the graph represents to a physical location on a map, and each edge of the graph represents a path between the physical locations located by nodes connected by the edge. In an embodiment, the graph additionally includes a speed component of the AV 100 at each vertex. The planning circuit 404 constructs the graph by any appropriate graph construction algorithm. In an embodiment, the planning circuit 404 constructs the graph by random sampling methods. e.g., RRT or RRT*. In an embodiment, the planning circuit 404 constructs the graph as a grid.

The planning circuit 404 uses any appropriate path-finding algorithm to find an optimal trajectory from the graph of available trajectories. Path-finding algorithms include: Dijkstra's algorithm, A*, D*, LPA*, as well as any appropriate variant of the foregoing examples. In an embodiment, the planning circuit 404 selects the optimal trajectory as the trajectory that results in the shortest distance traveled by the AV 100. In another embodiment, the planning circuit 404 selects the optimal trajectory as the trajectory that results in the shortest time spent by the AV 100 traveling. In an embodiment, the planning circuit 404 uses any appropriate path-finding algorithm to find the optimal trajectory incrementally, i.e., segment by segment.

In an embodiment, if the number of available trajectories is within a predetermined limit, the planning circuit 404 evaluates each trajectory separately to find the optimal trajectory. In an embodiment, the planning circuit 404 models the AV 100 as a finite state machine, and selects the optimal trajectory from the available trajectories by evaluating the possibility the AV 100 has to switch from one mode to another. For example, one mode can be "lane following," "lane changing," or "vehicle overtaking." The planning circuit 404 evaluates each trajectory based on the possibility that the AV 100 has to change modes, e.g., because the AV 100 is operating in stop-and-go traffic or on an otherwise crowded road.

Therefore, because the planning circuit 404 generates many iterations of proposed trajectories before ultimately sending a trajectory to the control circuit, and given that trajectories are generated and sent to the control circuit many times a second while the AV 100 is in operation, it is likely computationally infeasible for the planning circuit 404 to generate a corresponding speed profile for each proposed trajectory. Further, it is computationally infeasible for the planning circuit 404 to receive a generated speed profile from the control circuit 406 for each proposed trajectory generated by the planning circuit, as the control circuit 406 has to be provided up-to-date trajectories as the driving scenario changes for the AV 100.

In addition, the control circuit 406 conventionally cannot estimate the robustness of the speed profile. Specifically, the control circuit 406 cannot determine the degree in which the speed profile will be adjusted by the planning circuit 404 in response to changes in the environment proximate to the AV 100, i.e., as the AV 100 travels along the trajectory.

In addition to the computational infeasibility of having the planning circuit 404 generate a corresponding speed profile for each proposed trajectory, the planning circuit 404 does not receive sufficient data to generate speed profiles that the control circuit 406 otherwise has access to. The control circuit 406 receives information about dynamics of the AV 100, e.g., motion characteristics of the AV 100, as well as comfort metrics for passengers of the AV 100. In an embodiment, unlike the planning circuit 404, the control circuit 406 receives sensory information from various sensors of the AV, such information related to physical conditions of the AV, e.g., the brakes. To process many proposed trajectories, the planning circuit is given access to less data, because more data would inhibit the planning circuit which the control circuit relies on for continuous updated trajectories.

Because, at least for the reasons described above, a planning circuit generally cannot know the corresponding speed profile for a proposed trajectory before sending the trajectory to the control circuit. In an embodiment, the planning circuit generates trajectories by using one or more heuristics to estimate the corresponding speed profile the speed profiler will generate for each trajectory.

In an embodiment, the planning circuit 404 generates trajectories under an "optimistic" heuristic that makes an assumption about the corresponding speed profile the speed profiler 1202 will generate. In the optimistic approach, the planning circuit 404 assumes that the speed profiler 1202 will generate a speed profile for a trajectory with the highest allowable characteristics for the speed profile, e.g., the highest velocity and highest acceleration that the AV 100 can operate under. As this estimate is highly inaccurate on its own, an estimated time for the AV 100 is corrected by an empirically-derived factor. An optimistic model may also result in the planning circuit 404 generating trajectories that might be impossible for the AV 100 to execute, or that might be unsafe for the passengers in the AV 100.

In an embodiment, the planning circuit 404 generates trajectories under a "pessimistic" heuristic and assumes the speed profiler 1202 will generate a speed profile for a trajectory with the lowest allowable characteristics for the speed profile, e.g., the lowest velocity and lowest acceleration that the AV 100 can operate under. A pessimistic estimate can result in the AV 100 acting too "cautiously" and therefore unable to travel along certain trajectories, e.g., because the trajectory requires operating the AV 100 to overtake another vehicle by briefly accelerating in an oncoming lane, which requires a minimum acceleration to perform safely.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208. In an embodiment, the lateral tracking controller 1208 and the steering controller 1210 are implemented as a combined module.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Speed Profile Estimation

Figure 13:
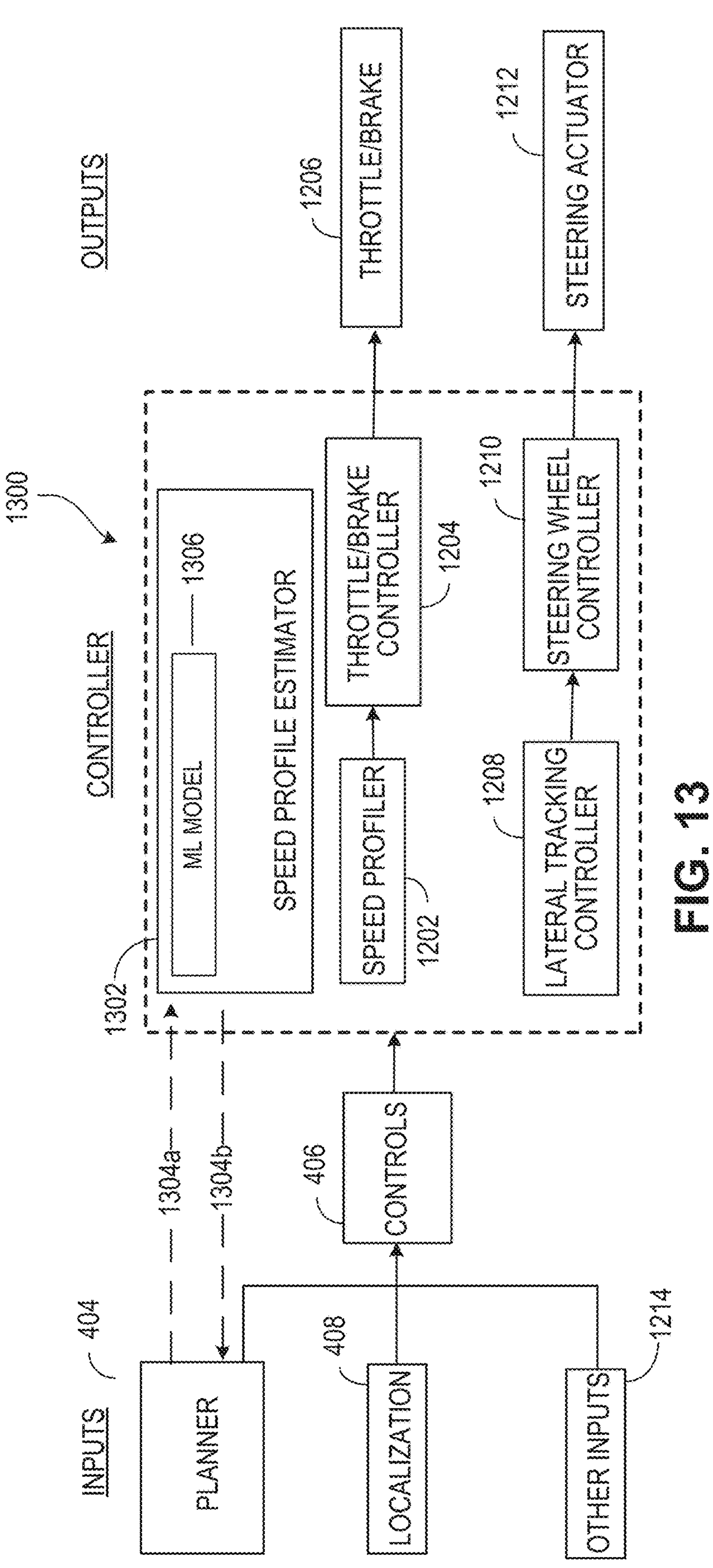
FIG. 13 shows a block diagram of the inputs, outputs, and components of a controller having a speed profile estimation circuit.

FIG. 13 shows a block diagram of the inputs, outputs, and components of a controller 1300 having a speed profile estimation circuit 1302. In an embodiment, the controller 1300 has similar components as the controller 1102 shown in FIG. 12. Specifically, In an embodiment, the speed profiler, throttle/brake controller, lateral tracking controller, and the steering wheel controller of the controller 1300 are the same as the speed profiler 1202, the throttle/brake controller 1204, the lateral track controller 1208, and the steering wheel controller 1210 of the controller 1102 shown in FIG. 12. The configuration and individual components of the controller 1300 can differ in other embodiments in any way consistent and appropriate with embodiments discussed above.

The speed profile estimation circuit 1302 receives as input, a proposed trajectory 1304*a* generated by the planning circuit 404, and generates, as output to the planning circuit 404, an estimated speed profile 1304*b* for the proposed trajectory 1304*a*, as well as a confidence score for the estimated speed profile 1304*b*. The estimated speed profile 1304*b* is an estimate of an actual speed profile that the speed profiler 1202 would have generated for the proposed trajectory 1304*a* if the speed profiler 1202 had received the proposed trajectory 1304*a* as input.

Estimating a speed profile by the speed profile estimation circuit 1302 allows the planning circuit 404 to adjust or reject a proposed trajectory before sending the proposed trajectory to the control circuit 406. In an embodiment, if the estimated speed profile 1304*a* indicates that the speed profile for the proposed trajectory 1304*a* would result in the AV 100 accelerating or braking in a way that would be uncomfortable to passengers, the planning circuit 404 refrains from sending the proposed trajectory to the control circuit 1306. Had the planning circuit 404 not received the estimated speed profile 1304*b* prior to sending the proposed trajectory to the control circuit 406, then the planning circuit 404 may have missed an opportunity to generate and send a better trajectory to the control circuit 406, according to one or more conditions discussed above.

The speed profile estimation circuit 1302 implements a machine learning model 1306 and uses the model to estimate a speed profile for an input trajectory. The speed profile estimation circuit 1302 receives, as input, the proposed trajectory 1304*a* and generates, as output, the speed profile estimate 1304*b*, as well as a respective confidence score, using learned parameter values of the machine learning model 1306. In an embodiment, the machine learning model 1306 is implemented by the speed profile estimation circuit and trained by any appropriate supervised learning technique, e.g., by an artificial neural network, reinforcement learning, a support vector machine, a regression model, or a random forest model.

In general, a machine learning model is trained on labeled training data by reducing a loss function to learn the parameter values of one or more parameters defined by the machine learning model. The machine learning model is implemented by the speed profile circuit 1302 to make predictions on new inputs, using the learned parameter values. As used herein "labeled training data" refers to individual vectors of data elements, with each individual vector associated with a respective "label," that indicates what the individual vector represents. Labeled training data can be labeled manually, e.g., by users; or automatically, e.g., by labelling data defining a trajectory with the ground-truth output of the control circuit 406 after receiving the trajectory.

For example, a neural network is an implementation of a particular machine learning techniques for learning parameter values for the machine learning model 1306. A neural network can have a plurality of network layers represented by a matrix of trained weights. As used herein, "network layers" refers to groups of interconnected processing elements that receive an input, process the input according to an activation function, and produce an output. An "input layer" is a network layer that receives an input, e.g., a vector, from a source outside the neural network, e.g. a user. An "output layer" is a network layer that receives one or more inputs from either an input layer or a hidden layer of the neural network, and generates a final output for the neural network. A neural network can have one or more "hidden layers," which refers to network layers that receive input from either the input layer or another hidden layer of the neural network, and generate output for either the output layer or another hidden layer of the neural network.

As used herein, "trained weights" refers to learned parameter values at each network layer that adjust an input at a network layer to reduce or increase the importance of an input at the network layer. In an embodiment, weights are trained for a machine learning model by performing a forward pass of a neural network using one or more labeled training examples, and then calculating a loss by a loss function at each layer, e.g., by backpropagation using stochastic or batch gradient descent. The weights are updated to reduce the loss representing a difference between a predicted value and a ground-truth value for the labeled training example (i.e., the label itself).

As one example, weights of the machine learning model 1306 are trained for a set number of iterations. As another example, the weights of the machine learning model 1306 are trained until the calculated loss for each layer is within a predetermined threshold. When training is complete, the weights are referred to as the "trained weights" of the neural network.

In an embodiment, the weights of the machine learning model 1306 are trained using training vectors representing trajectories generated by the planning circuit 404. Each training vector is labeled with the corresponding speed profile generated by the speed profiler 1202 for the trajectory represented by the training vector. The weights of the machine learning model 1306 are trained using the training vectors to learn parameters for estimating a speed profile for a previously un-encountered vector representing a new trajectory. The output speed profile generated by the machine learning 1306 is called the estimated speed profile for the new trajectory.

In an embodiment, the weights of the machine learning model 1306 are trained offline on a collection of labeled training vectors of trajectories generated by a planning circuit that is configured the same or substantially the same as the planning circuit 404. The labeled training data is collected from the AV 100 or other similarly configured autonomous vehicles as they are operated in different driving scenarios. For example, the AV system for the autonomous vehicle generates multiple trajectories and corresponding speed profiles for each trajectory, as the autonomous vehicle operates in different driving scenarios. In an embodiment, the AV system for an autonomous vehicle stores and transmits data defining pairs of trajectories and speed profiles.

The weights of the machine learning model can also be trained on labeled training data not available to the planning circuit 404, e.g., motion characteristics of the AV 100 and comfort metrics of passengers of the AV 100, as discussed above. In an embodiment, the training data defines trajectories generated by the planning circuit 404, information about classified objects proximate to the AV 100, i.e., sensor data processed by a perception pipeline, as discussed blow, and motion characteristics, comfort metrics, or other information available to the control circuit 406 but not the planning circuit 404.

In an embodiment, the weights of the machine learning model 1306 are trained online by pairs of proposed trajectories and corresponding speed profiles generated by the speed profiler 1202 on the AV 100. For example, when the speed profiler 1202 generates a speed profile for a trajectory, the speed profile estimation circuit 1302 updates the weights of the machine learning model 1306 using the generated speed profile and corresponding trajectory, e.g., using stochastic gradient descent with backpropagation over a loss function. In an embodiment, the speed profile estimation circuit 1302 batches generated pairs and retrains the machine learning model 1306 on each batch.

The estimated speed profile **1304*b* is an approximation of the actual speed profile that the speed profiler 1202 would generate for the proposed trajectory 1304*a*, therefore, In an embodiment, the speed profile estimation circuit 1302 additionally generates a confidence score as part of the estimated speed profile 1304*b*. The planning circuit 404 uses the confidence score for the estimated speed profile 1304*b* to determine whether to rely on the estimated speed profile 1304*b* in making the decision to send the proposed trajectory 1304*a* to the control circuit 406**.

In an embodiment, if the confidence score is low, e.g., below a predetermined threshold, then the planning circuit 404 is configured to "fall back" to another model of generating trajectories, e.g., by the optimistic or pessimistic approaches discussed above. In another embodiment, the planning circuit 404 is configured to generate and send a new proposed trajectory to the speed profile estimation circuit 1302. In response, the speed profile estimation circuit 1302 generates and sends a new speed profile estimate having a new confidence score. In another embodiment, the planning circuit 404 is configured to evaluate the new speed profile estimate based on the corresponding confidence score to determine whether to send the new proposed trajectory to the control circuit 406.

In an embodiment, the planning circuit 404 rejects a proposed trajectory with a low confidence score, even if the proposed trajectory is otherwise safe, comfortable for passengers, and lawful. This is because low confidence is a sign of an uncertain estimate, which generally is less robust to changes in the environment of the AV 100. Therefore, In an embodiment, the planning circuit 404 selects a trajectory with a higher confidence score over another trajectory, even if the other trajectory is more favorable in terms of the conditions discussed above.

In an embodiment, the speed profile estimation circuit 1302 generates a confidence score for the proposed trajectory **1304*a* by estimating a variance between the proposed trajectory 1304*a* and the actual speed profile that the speed profiler 1202 would generate if the speed profiler 1202 received the proposed trajectory 1304*a* as input. For example, an estimated high variance indicates that the proposed trajectory 1304*a* is not a reliable estimate, therefore the speed profile estimation circuit 1302 will assign a low confidence score to the speed profile estimate 1304*b***.

Conversely, an estimated low variance indicates the proposed trajectory **1304*a* is a reliable estimate because the proposed trajectory 1304*a* does not differ much with other speed profile estimates for the same or similar driving scenarios. Therefore, the speed profile estimation circuit 1302 can assign a high confidence score to the speed profile estimate 1304*b***.

In an embodiment, the weights of the machine learning model 1306 is trained on training vectors that represent data that is unavailable to the planning circuit 404. More features represented by the training vectors, e.g., features representing the physical characteristics of the AV 100, can be used to train more accurate parameters.

In an embodiment, these additional features represent data received by the speed profiler 1202 through a perception-controller pipeline 1404 (discussed below) and are used to generate a speed profile in response to receiving a trajectory. Therefore, although these additional features represent data that is not provided to the planning circuit 404 during operation of the AV 100, training the weights of the machine learning model 1306 on vectors that include these additional features can be useful to learn accurate parameter values for the machine learning model 1306.

Figure 14:
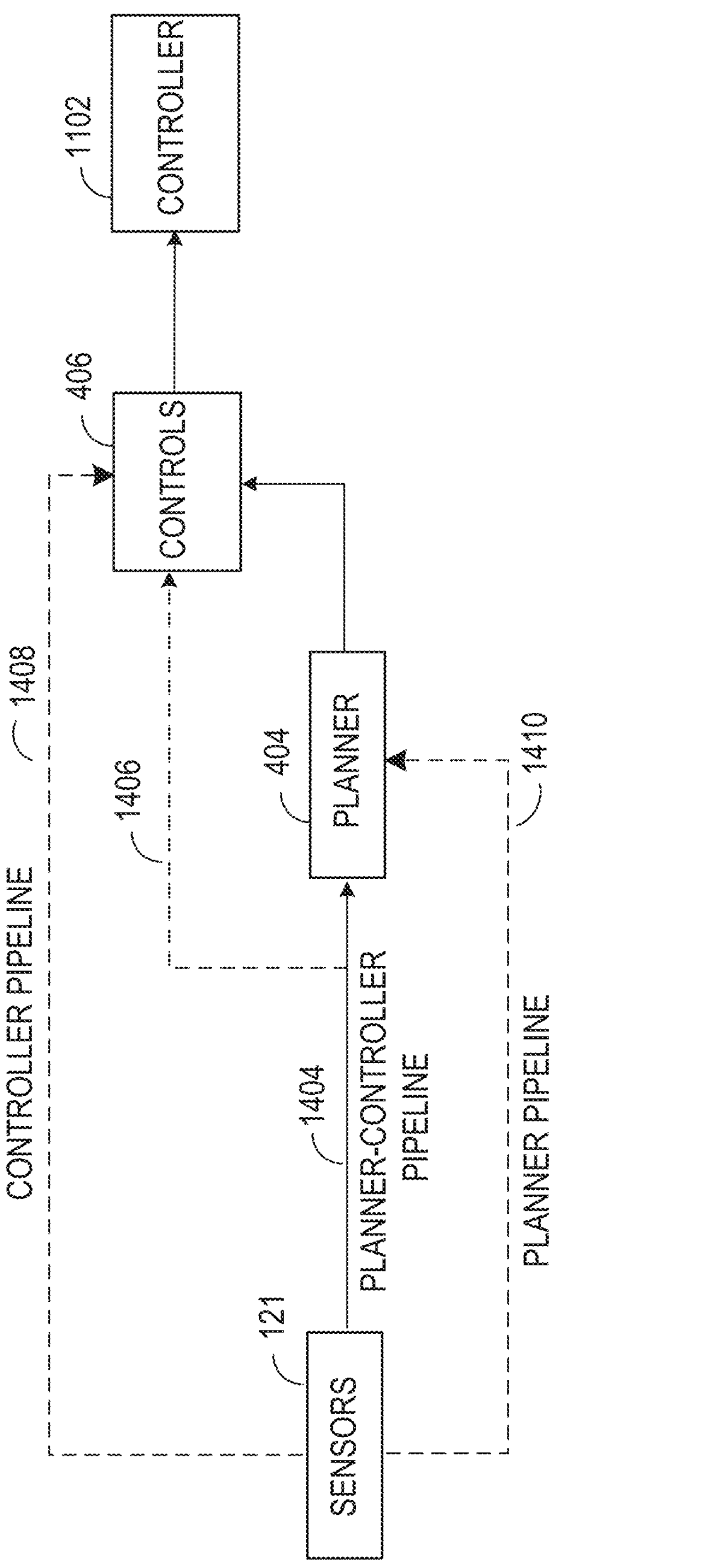
FIG. 14 shows a block diagram of a planner perception pipeline and a controller perception pipeline for the planning circuit and the control circuit, respectively.

FIG. 14 shows a block diagram of a planner-controller pipeline 1404 for the planning circuit 404 and the control circuit 406. As used herein, the "planner-controller pipeline 1404" refers to data received that is sent to the planning circuit 404 and control circuit 406, from the sensors 121. The planner-controller pipeline 1404 also includes any processing performed on the data from the sensors 121 before the data is received by the planning circuit 404. In an embodiment, the planner-controller pipeline 1404 also includes additional information 1406 that is processed by the control circuit 406 but not the planning circuit 404.

In an embodiment, data from the sensors 121 is processed through any combination of the planner-controller pipeline 1404, an alternative perception pipeline 1408, and a planner pipeline 1410. As discussed above and in further detail, below, in an embodiment, the planning circuit 404 receives information from the planner pipeline 1410 that is not available to the control circuit 406. Likewise, in an embodiment, the control circuit 406 receives information from the alternative perception pipeline 1408 that is not available to the planning circuit 404.

This data includes data collected by the sensors 121, as well as data stored in the database module 410, as shown with respect to FIG. 4. In an embodiment, the perception-controller pipeline 1404, the alternative perception pipeline 1408 and the planner pipeline 1410 include respective processing circuits in any combination of the modules as shown in FIG. 4 for processing data through a respective pipeline.

In an embodiment, the planner-controller pipeline 1404 bypasses the planning circuit 404, shown by the dotted line 1406. In an embodiment, the planning circuit 404 is bypassed because the planning circuit 404 does not require as much information to generate a trajectory for the control circuit 406. Because the planning circuit 404 generates many trajectories before sending a trajectory to the control circuit 406, less data is sent to the planning circuit 404 to facilitate rapid processing of many different trajectories.

In an embodiment, the planning-controller pipeline 1404 includes the perception circuit 402, which can classify physical objects using the one or more sensors 121. The classified objects 416 can be provided to the planning circuit 404, but may not be provided to the control circuit 406, because the control circuit 406 does not require data representing the classified objects 416 to operate the AV 100 along a trajectory. In an embodiment, the planner pipeline 1410 includes the perception circuit 402 and processes data from the sensors 121 that is only received by the planning circuit 404, e.g., information related to the classified objects.

In an embodiment, the alternative perception pipeline 1408 processes data from the sensors 121 that is only received by the control circuit 406 but not the planning circuit 404. For example, the control circuit 406 receives data defining a representation of the environment proximate to the AV 100 that facilitates the control circuit 406 make quick and accurate adjustments to the operation of the AV 100 as it travels along the trajectory. In an embodiment, one representation is by a dynamic occupancy grid ("DOG"), in which objects proximate to the AV 100 are modeled as collections of particles, similar to how fluids are modeled in field theory-based fluid dynamics. A detailed discussion of DOG is provided in "FIELD THEORY BASED PERCEPTION FOR AUTONOMOUS VEHICLES," U.S. Provisional Patent Application No. 62/837,902, filed on Apr. 24, 2019 and which is incorporated herein by reference in its entirety. In these embodiments, data processed through the alternative perception pipeline 1408 is not passed through the planning circuit 404 because the planning circuit 404 is unable to or unable to process efficiently, the data from the pipeline 1408.

In an embodiment, the planner-controller pipeline 1406 includes the localization module 408. The localization module 408 provides the position of the AV 100 to one or both circuits 404 and 406. In an embodiment, the planner-controller pipeline 1406 includes data from the database circuit 410, e.g., as described above with respect to FIG. 4. In this embodiment, both the planning circuit 404 and the control circuit 406 may require information related to the position of the AV 100 to perform their respective functions.

The data processed by the planner-controller pipeline 1406 can be used to create training vectors to train the machine learning model 1306. These training vectors can represent trajectories, as well as additional features based on information received by the control circuit 406 and not the planning circuit 404, i.e., because the additional features are represented by data through the bypass pipeline 1406 that bypasses the planning circuit 404. In operation, when the planning circuit sends the proposed trajectory **1304*a* to the control circuit 406, the planning circuit 404 will have generated the proposed trajectory without data in the bypass pipeline 1406. Nonetheless, the speed profile estimation circuit 1302 returns the estimated speed profile 1304*b*, even if the machine learning model 1306** was trained on training vectors having the additional features.

In an embodiment, the speed profile estimation circuit 1302 stores and uses associations between previously encountered driving scenarios and speed profiles measured during training to provide speed profile estimates for proposed trajectories of a current driving scenario for the AV 100. For example, a passenger of the AV 100 can use the AV 100 daily, e.g., for a work commute. The work commute may involve traveling along the same road or roads to a destination on a routine basis, e.g., daily. In an embodiment, the planning circuit 404 generates trajectories that are the same or similar to other trajectories generated during these routine operations of the AV 100.

In an embodiment, the speed profiler estimation circuit 1302 takes into account the location of the AV 100 corresponding to speed profile estimates having a low confidence score. The lower confidence scores can, for example, correspond to conditions of the environment, e.g., low-visibility or occlusions in general, or correspond to the condition of the AV 100 itself, e.g., a higher tendency for a sensor to generate a false positive in certain environments versus others.

The speed profile estimation circuit 1302 is configured, In an embodiment, to track how often the speed profile estimation circuit 1302 receives a particular proposed trajectory. Upon identifying a particular proposed trajectory that has been received a certain number of times and within a certain period of time, the speed profile estimation circuit 1302 stores an association between the driving scenario the AV 100 is driving in, and the estimated speed profile.

The speed profile estimation circuit 1302 can store the associations between a speed profile and a driving scenario as part of any appropriate data structure for fast look-up. In an embodiment, the data structure is a hash table. In an embodiment the data structure is an associative array.

In an embodiment, after storing encountered speed profiles and corresponding driving scenarios, the speed profile estimation circuit 1302 receives a new proposed trajectory generated by the planning circuit 404 in response to a current driving scenario. The speed profile estimation circuit 1302 compares the current driving scenario with stored driving scenarios that are each associated with a respective speed profile estimate. In comparing the current driving scenario with the stored driving scenarios, the speed profile estimation circuit 1302 identifies a stored driving scenario that is similar to the driving scenario within a similarity threshold.

For example and in an embodiment, the speed profile estimation circuit 1302 determines if the current driving scenario is within a similarity threshold to another driving scenario by comparing each individual condition of both driving scenarios. Two driving scenarios are similar because they both represent an environment with high visibility and few physical obstacles proximate to the AV 100. In an embodiment, the similarity threshold is empirically determined.

In an embodiment, if the speed profile estimation circuit 1302 identifies a stored driving scenario, than the speed profile estimate for the proposed trajectory is the speed profile estimate associated with the stored driving scenario. By storing and retrieving speed profile estimates for common driving scenarios, the speed profile estimation circuit 1302 obtains a speed profile estimate faster for the planning circuit 404 than generating a new estimate.

Figure 15:
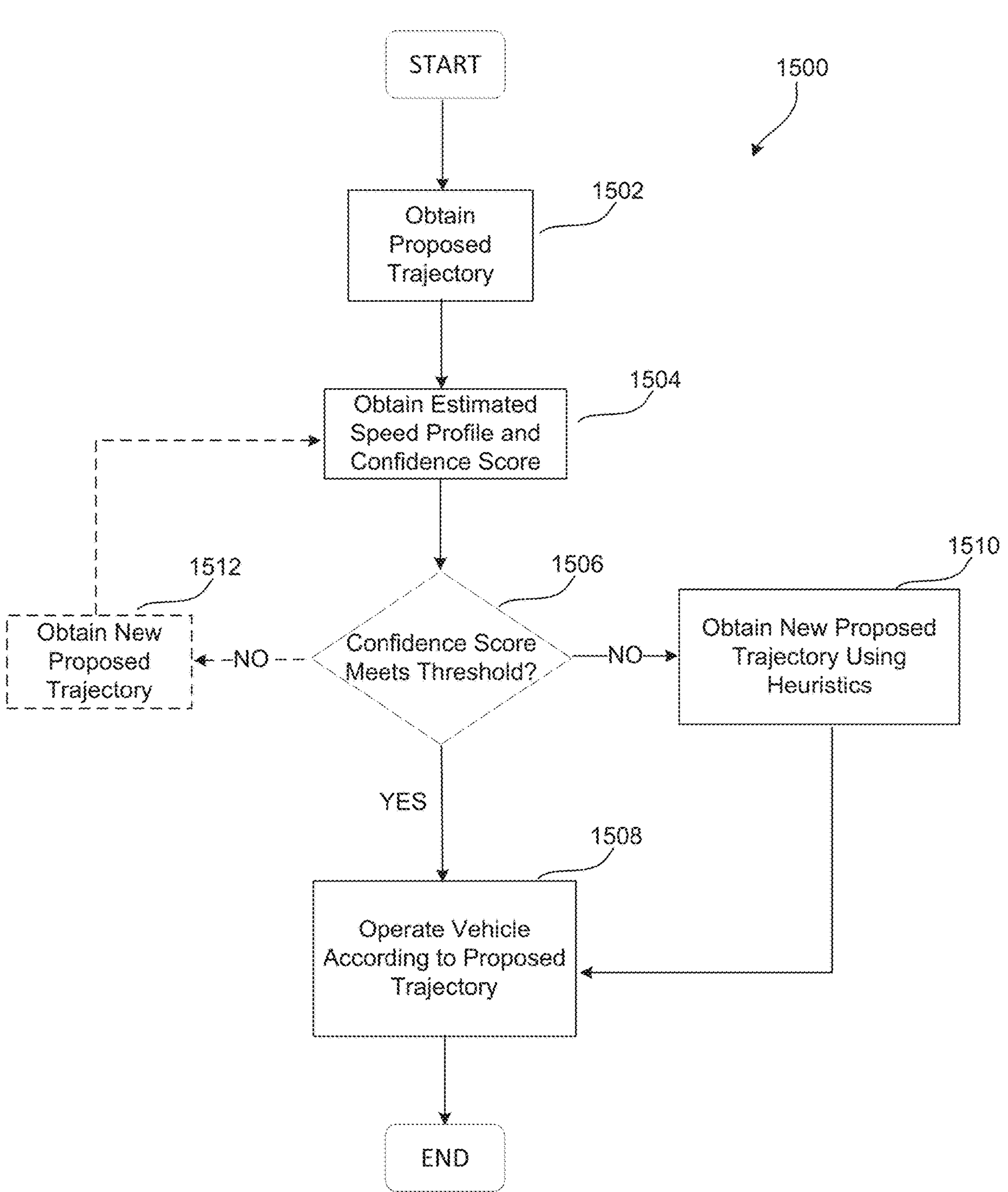
FIG. 15 is a flowchart representing a process for operating a vehicle along a trajectory using estimated speed profiles.

FIG. 15 is a flowchart representing a process 1500 for operating a vehicle along a trajectory using an estimated speed profile. In an embodiment, the vehicle is the autonomous vehicle 100 shown in FIG. 1, and the process 1500 is carried out by a planning circuit and control circuit, such as the planning circuit 404 and the control circuit 406 shown in FIG. 4.

The planning circuit obtains and sends a proposed trajectory to the control circuit (step 1502).

The planning circuit obtains an estimated speed profile and a confidence score for the speed profile estimate (step 1504). As discussed above with reference to FIG. 13, the speed profile estimation circuit of the control circuit processes the proposed trajectory using learned parameter values of a machine learning model to obtain a speed profile estimate. Further, the control circuit through the speed profile estimation circuit can generate a confidence score based on the variance between the estimated speed profile and other speed profiles generated by the speed profiler. In an embodiment, the speed profile estimation circuit generates multiple speed profiles for trajectories having similar parameter values as the proposed trajectory. The variance between each of the multiple speed profiles is the confidence score for the estimated speed profile. In an embodiment, the speed profile estimation circuit varies the proposed trajectory by incrementing or decrementing the position or motion characteristics of the AV 100 as represented in the trajectory, and then computes a respective speed profile estimate for the trajectory. Generally, the smaller the variance the higher the confidence score for the estimated speed profile.

For example, the control circuit can perform Principal Component Analysis to determine a variance and subsequently a confidence score for the estimated speed profile. Principle Component Analysis refers to a statistical technique performed on a set of data by converting each data element into a respective set of values representing principal components for the data element. The principal components of each data element are compared with principal components of other data elements to determine a variance between each data element.

The planning circuit determines whether the confidence score for the speed profile estimate meets a predetermined confidence score threshold (decision diamond 1506). As discussed above with reference to FIG. 13, the confidence score can be empirically determined.

In accordance with a determination that the confidence score does meet the predetermined threshold, the planning circuit sends the control circuit the proposed trajectory, and the control circuit in turn operates the vehicle according to the proposed trajectory (step 1508).

In accordance with a determination that the confidence score does not meet the predetermined threshold, In an embodiment the planning circuit obtains a new proposed trajectory using a heuristic (step 1510). For example, the heuristic can be a pessimistic or optimistic heuristic, as discussed above. After performing step 1510, the planning circuit sends the control circuit the new proposed trajectory and the control circuit operates the vehicle according to the new proposed trajectory (step 1508).

In accordance with a determination that confidence score does not meet the predetermined threshold, In an embodiment the planning circuit obtains a new proposed trajectory (step 1512). The planning circuit can repeat step 1504 to obtain an estimated speed profile and confidence score for the new proposed trajectory (step 1504).

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:

configuring a plurality of weights for a machine learning model to estimate a speed profile for a vehicle in a driving environment, wherein at least one weight of the plurality of weights is based on a past trajectory of the vehicle and a speed profile corresponding to the past trajectory;

providing a proposed trajectory for the vehicle in the driving environment as an input to the configured machine learning model;

in response to providing the proposed trajectory as the input to the machine learning model, obtaining an output of the machine learning model comprising an estimated speed profile corresponding to the proposed trajectory; and determining a driving behavior of the vehicle in the driving environment using the estimated speed profile.

2. The method of claim 1, wherein the weights of the machine learning model are further based on one or more of:

comfort metrics of passengers of the vehicle, information about objects proximate to the vehicle, features corresponding to physical characteristics of the vehicle, or motion characteristics of the vehicle.

3. The method of claim 1, further comprising:

determining the plurality of weights or a corresponding plurality of speed profiles based at least on past driving behavior of the vehicle in different driving scenarios.

4. The method of claim 1, wherein the output of the machine learning model further comprises a confidence score corresponding to the estimated speed profile, the confidence score indicating a similarity of the estimated speed profile to an actual speed profile for the proposed trajectory, the method further comprising:

determining the driving behavior of the vehicle in the driving environment using the estimated speed profile and the confidence score.

5. The method of claim 4, wherein determining the driving behavior of the vehicle in the driving environment using the estimated speed profile and the confidence score further comprises:

determining whether the confidence score meets a confidence threshold; and in accordance with a determination that the confidence score meets or exceeds the confidence threshold, operating the vehicle along the proposed trajectory.

6. The method of claim 4, wherein determining the driving behavior of the vehicle in the driving environment using the estimated speed profile and the confidence score further comprises:

determining whether the confidence score meets a confidence threshold; and in accordance with a determination that the confidence score does not meet the confidence threshold:

obtaining a second trajectory based on a predetermined speed profile heuristic, and operating the vehicle along the second trajectory.

7. The method of claim 4, further comprising:

determining a variance between the estimated speed profile and the actual speed profile;

upon determining that the variance is high, assigning a low value to the confidence score; and upon determining that the variance is low, assigning a high value to the confidence score.

8. The method of claim 4, wherein the estimated speed profile for the proposed trajectory is based on:

comparing the driving environment corresponding to the proposed trajectory to a plurality of driving scenarios in memory;

in response to the comparing, identifying a particular driving scenario of the plurality of driving scenarios that is similar to the driving environment within a threshold value; and upon identifying the particular driving scenario, assigning a speed profile associated with the particular driving scenario as the estimated speed profile for the proposed trajectory.

9. An apparatus comprising:

one or more processors; and machine-readable memory storing instructions that, when executed, are configured to cause the one or more processors to perform operations comprising:

configuring a plurality of weights for a machine learning model to estimate a speed profile for a vehicle in a driving environment, wherein at least one weight of the plurality of weights is based on a past trajectory of the vehicle and a speed profile corresponding to the past trajectory;

providing a proposed trajectory for the vehicle in the driving environment as an input to the configured machine learning model;

in response to providing the proposed trajectory as the input to the machine learning model, obtaining an output of the machine learning model comprising an estimated speed profile corresponding to the proposed trajectory; and determining a driving behavior of the vehicle in the driving environment using the estimated speed profile.

10. The apparatus of claim 9, wherein the weights of the machine learning model are further based on one or more of:

comfort metrics of passengers of the vehicle, information about objects proximate to the vehicle, features corresponding to physical characteristics of the vehicle, or motion characteristics of the vehicle.

11. The apparatus of claim 9, the operations further comprising:

determining the plurality of weights or a corresponding plurality of speed profiles based at least on past driving behavior of the vehicle in different driving scenarios.

12. The apparatus of claim 9, wherein the output of the machine learning model further comprises a confidence score corresponding to the estimated speed profile, the confidence score indicating a similarity of the estimated speed profile to an actual speed profile for the proposed trajectory, the operations further comprising:

determining the driving behavior of the vehicle in the driving environment using the estimated speed profile and the confidence score.

13. The apparatus of claim 12, wherein determining the driving behavior of the vehicle in the driving environment using the estimated speed profile and the confidence score further comprises:

determining whether the confidence score meets a confidence threshold; and in accordance with a determination that the confidence score meets or exceeds the confidence threshold, operating the vehicle along the proposed trajectory.

14. The apparatus of claim 12, wherein determining the driving behavior of the vehicle in the driving environment using the estimated speed profile and the confidence score further comprises:

determining whether the confidence score meets a confidence threshold; and in accordance with a determination that the confidence score does not meet the confidence threshold:

obtaining a second trajectory based on a predetermined speed profile heuristic, and operating the vehicle along the second trajectory.

15. The apparatus of claim 12, the operations further comprising:

determining a variance between the estimated speed profile and the actual speed profile;

upon determining that the variance is high, assigning a low value to the confidence score; and upon determining that the variance is low, assigning a high value to the confidence score.

16. The apparatus of claim 12, wherein the estimated speed profile for the proposed trajectory is based on:

comparing the driving environment corresponding to the proposed trajectory to a plurality of driving scenarios in memory;

in response to the comparing, identifying a particular driving scenario of the plurality of driving scenarios that is similar to the driving environment within a threshold value; and upon identifying the particular driving scenario, assigning a speed profile associated with the particular driving scenario as the estimated speed profile for the proposed trajectory.

17. One or more non-transitory machine-readable media storing instructions that, when executed, are configured to cause one or more processors to perform operations comprising:

configuring a plurality of weights for a machine learning model to estimate a speed profile for a vehicle in a driving environment, wherein at least one weight of the plurality of weights is based on a past trajectory of the vehicle and a speed profile corresponding to the past trajectory;

providing a proposed trajectory for the vehicle in the driving environment as an input to the configured machine learning model;

in response to providing the proposed trajectory as the input to the machine learning model, obtaining an output of the machine learning model comprising an estimated speed profile corresponding to the proposed trajectory; and determining a driving behavior of the vehicle in the driving environment using the estimated speed profile.

18. The one or more non-transitory machine-readable media of claim 17, wherein the weights of the machine learning model are further based on one or more of:

comfort metrics of passengers of the vehicle, information about objects proximate to the vehicle, features corresponding to physical characteristics of the vehicle, or motion characteristics of the vehicle.

19. The one or more non-transitory machine-readable media of claim 17, wherein the output of the machine learning model further comprises a confidence score corresponding to the estimated speed profile, the confidence score indicating a similarity of the estimated speed profile to an actual speed profile for the proposed trajectory, the operations further comprising:

determining whether the confidence score meets a confidence threshold; and in accordance with a determination that the confidence score meets or exceeds the confidence threshold, operating the vehicle along the proposed trajectory; and in accordance with a determination that the confidence score does not meet the confidence threshold:

obtaining a second trajectory based on a predetermined speed profile heuristic, and operating the vehicle along the second trajectory.

20. The one or more non-transitory machine-readable media of claim 19, the operations further comprising:

determining a variance between the estimated speed profile and the actual speed profile;

upon determining that the variance is high, assigning a low value to the confidence score; and upon determining that the variance is low, assigning a high value to the confidence score.

21. The one or more non-transitory machine-readable media of claim 19, wherein the estimated speed profile for the proposed trajectory is based on:

comparing the driving environment corresponding to the proposed trajectory to a plurality of driving scenarios in memory;

in response to the comparing, identifying a particular driving scenario of the plurality of driving scenarios that is similar to the driving environment within a threshold value; and upon identifying the particular driving scenario, assigning a speed profile associated with the particular driving scenario as the estimated speed profile for the proposed trajectory.

* * * * *